United States Patent
Do et al.

(10) Patent No.: US 11,146,774 B2
(45) Date of Patent: Oct. 12, 2021

(54) OPERATING METHOD OF THREE-DIMENSIONAL FACIAL DIAGNOSIS APPARATUS

(71) Applicant: Korea Institute of Oriental Medicine, Daejeon (KR)

(72) Inventors: Jun Hyeong Do, Daejeon (KR); Young Min Kim, Daejeon (KR); Jun Su Jang, Daejeon (KR)

(73) Assignee: Korea Institute of Oriental Medicine, Daejeon (KR)

( * ) Notice: Subject to any disclaimer, the term of this patent is extended or adjusted under 35 U.S.C. 154(b) by 0 days.

(21) Appl. No.: 15/733,139

(22) PCT Filed: Dec. 18, 2018

(86) PCT No.: PCT/KR2018/016080
§ 371 (c)(1),
(2) Date: May 27, 2020

(87) PCT Pub. No.: WO2019/124918
PCT Pub. Date: Jun. 27, 2019

(65) Prior Publication Data
US 2021/0105452 A1    Apr. 8, 2021

(30) Foreign Application Priority Data

Dec. 18, 2017  (KR) .......................... 10-2017-0173754

(51) Int. Cl.
*H04N 13/221* (2018.01)
*G06T 7/579* (2017.01)

(52) U.S. Cl.
CPC ........... *H04N 13/221* (2018.05); *G06T 7/579* (2017.01); *G06T 2207/30201* (2013.01)

(58) Field of Classification Search
CPC .................. H04N 13/221; G06T 7/579; G06T 2207/30201
See application file for complete search history.

(56) References Cited

U.S. PATENT DOCUMENTS

2015/0157243 A1*  6/2015  Do .......................... G16H 10/60
                                                                    600/408
2019/0083219 A1*  3/2019  Sharer ................ A61C 13/0004

FOREIGN PATENT DOCUMENTS

| CN | 1432481 A | * | 7/2003 |
| CN | 101825839 A | * | 9/2010 |
| JP | 2007/516503 | | 6/2007 |
| JP | 2008/191683 | | 8/2008 |

(Continued)

OTHER PUBLICATIONS

Kim et al.; "Recent Trends of Real-time 3D Reconstruction Technology using RGB-D Cameras." Electronics and Telecommunications Trends; ETRI; 2016; 8 Pages.

*Primary Examiner* — Francis Geroleo
(74) *Attorney, Agent, or Firm* — Thorpe North & Western, LLP; Todd B. Alder

(57) ABSTRACT

The present invention relates to a three-dimensional face image capturing method and comprises the steps of: capturing a face region of a user in a direction from a right chin to a left forehead; capturing the face region in a direction from a left forehead to a left chin; capturing the face region in a direction from a left chin to a right forehead; and capturing the face region in a direction from a right forehead to a center of face.

9 Claims, 6 Drawing Sheets

(56) References Cited

FOREIGN PATENT DOCUMENTS

| | | | |
|---|---|---|---|
| JP | 2009005845 A | * | 1/2009 |
| KR | 2014/0014826 | | 2/2014 |
| KR | 2014/0077751 | | 6/2014 |
| KR | 2015/0113751 | | 10/2015 |
| KR | 101556992 B1 | | 10/2015 |
| KR | 101569693 B1 | | 11/2015 |
| KR | 10-2017-0044895 | | 4/2017 |
| KR | 10-2017-0070420 | | 6/2017 |
| KR | 101810959 B1 | * | 12/2017 |

* cited by examiner

OPERATING METHOD OF THREE-DIMENSIONAL FACIAL DIAGNOSIS APPARATUS

TECHNICAL FIELD

Embodiments relate to an apparatus for acquiring a face image and, more particularly, to a method of effectively operating an apparatus for acquiring a face image.

BACKGROUND ART

Apparatuses for capturing a three-dimensional (3D) image using various methods have been developed. The most common 3D image capturing apparatus generates a 3D image by fusing images acquired using an RGB camera and a depth camera.

The 3D image photographing apparatus may cause a blind spot depending on a capturing path and require a long measurement time. There is a demand for an algorithm for a moving path most appropriate for capturing and acquiring a 3D face image.

Korean Patent Application Publication No. 10-2014-0077751 (published on Jun. 24, 2014) proposes an apparatus for scanning a 3D face. The publication relates to a 3D face scanning apparatus with mobility improved by reducing the volume.

DISCLOSURE OF INVENTION

Technical Solutions

According to an aspect, there is provided an operating method of a three-dimensional (3D) face diagnosis apparatus for obtaining 3D image information including face depth information of the front and side views of a face of a user by capturing the face by elevating a camera in the direction of a vertical axis and rotating the camera about the vertical axis along a capturing trajectory around the face of the user by means of a camera moving instrument, the operating method performed at least temporarily by a computer, the operating method including capturing a face region of a user in the direction from the left forehead to the right chin, capturing the face region in the direction from the right chin to the right forehead, capturing the face region in the direction from the right forehead to the left chin, and capturing the face region in the direction from the left chin to the left forehead.

A moving path in the capturing of the face region in the direction from the left forehead to the right chin and a moving path in the capturing of the face region in the direction from the right forehead to the left chin may intersect at center of the face of the user.

A moving path in the capturing of the face region in the direction from the left chin to the left forehead and a moving path in the capturing of the face region in the direction from the right chin to the right forehead may convexly move outward from the face of the user.

The capturings of the face region may include adjusting a moving range based on the size of the face of the user.

According to an aspect, there is provided an operating method of a 3D face diagnosis apparatus for obtaining 3D image information including face depth information of the front and side views of a face of a user by capturing the face by elevating a camera in the direction of a vertical axis and rotating the camera about the vertical axis along a capturing trajectory around the face of the user by means of a camera moving instrument, the operating method performed at least temporarily by a computer, the operating method including capturing a face region of a user in the direction from the right chin to the left forehead, capturing the face region in the direction from the left forehead to the left chin, capturing the face region in the direction from the left chin to the right forehead, and capturing the face region in the direction from the right forehead to the right chin.

A moving path in the capturing of the face region in the direction from the right chin to the left forehead and a moving path in the capturing of the face region in the direction from the left chin to the right forehead may intersect at center of the face of the user.

A moving path in the capturing of the face region in the direction from the left forehead to the left chin and a moving path in the capturing of the face region in the direction from the right forehead to the right chin may convexly move outward from the face of the user.

The capturings of the face region may include adjusting a moving range based on the size of the face of the user.

According to an aspect, there is provided an operating method of a 3D face diagnosis apparatus for obtaining 3D image information including face depth information of the front and side views of a face of a user by capturing the face by elevating a camera in the direction of a vertical axis and rotating the camera about the vertical axis along a capturing trajectory around the face of the user by means of a camera moving instrument, the operating method performed at least temporarily by a computer, the operating method including primarily capturing, by a camera part, a face region of a user, calculating, by a calculator, the size of a face of the user from the primarily captured image, calculating, by the calculator, a moving range of secondary capturing based on the size of the face, and capturing, by the camera part, the face region in the direction from the left forehead to the right chin, in the direction from the right chin to the right forehead, in the direction from the right forehead to the left chin, and in the direction from the left chin to the left forehead.

Alternatively, the operating method may include primarily capturing, by a camera part, a face region of a user, calculating, by a calculator, the size of a face of the user from the primarily captured image, calculating, by the calculator, a moving range of secondary capturing based on the size of the face, and capturing, by the camera part, the face region in the direction from the right chin to the left forehead, in the direction from the left forehead to the left chin, in the direction from the left chin to the right forehead, and in the direction from the right forehead to the right chin.

According to an aspect, there is provided an operating method of a 3D face diagnosis apparatus for obtaining 3D image information including face depth information of the front and side views of a face of a user by capturing the face, the operating method including capturing a face region of a user in the direction from center of the face to the right chin, capturing the face region in the direction from the right chin to the right forehead, capturing the face region in the direction from the right forehead to the left chin, capturing the face region in the direction from the left chin to the left forehead, and capturing the face region in the direction from the left forehead to center of the face. Further, an order of specific capturing may also be changed.

According to an aspect, there is provided a computer-readable storage medium storing instructions that, when executed by a processor, cause the processor to perform the operating methods of the 3D face diagnosis apparatus.

DETAILED DESCRIPTION

Figure 1:
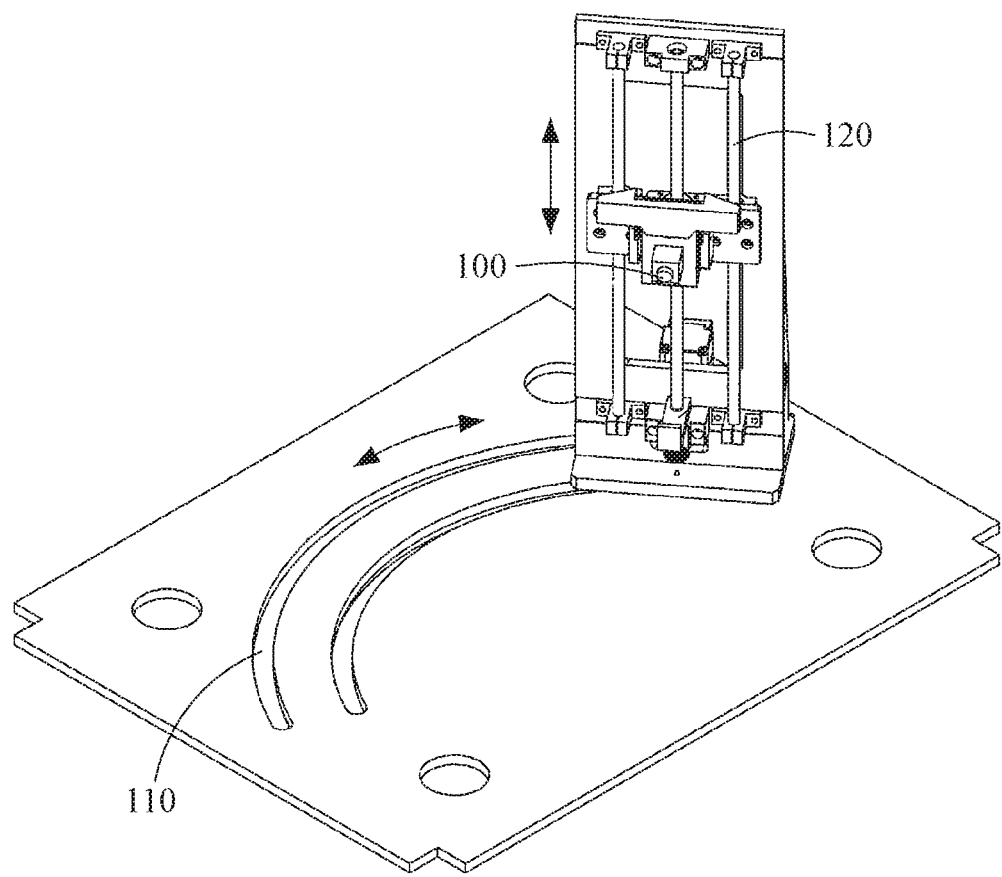
FIG. 1 illustrates a structure of a three-dimensional (3D) face diagnosis apparatus according to an embodiment.

Hereinafter, the embodiments will be described in detail with reference to the accompanying drawings. The scope of the right, however, should not be construed as limited to the embodiments set forth herein. Like reference numerals in the drawings refer to like elements.

The terms used herein are selected from terms generally understood by those skilled in the related art, but may have different meanings according to technical developments and/or changes, practices, and preferences of an engineer. Accordingly, the terms used herein should not be construed as limiting the technical spirit, and should be construed as illustrative terms to describe embodiments.

In addition, in a specific case, most appropriate terms are arbitrarily selected by the applicant. In this instance, the meanings of the arbitrarily used terms will be clearly explained in the corresponding description. Hence, the terms should be understood not by the simple names of the terms but by the meanings of the terms and the following overall description of this specification.

FIG. 1 illustrates a structure of a three-dimensional (3D) face diagnosis apparatus according to an embodiment. A 3D face diagnosis apparatus includes a camera 100 and a camera moving instrument. The camera moves along a vertical moving trajectory 120 and a rotational moving trajectory 130.

The camera 100 may include a general RGB camera and a depth camera for capturing a depth image, and acquire 3D image information of a face. In detail, it is possible to acquire the 3D image information of the face in the maximum range by capturing the front and side views of the face.

The camera moving instrument may elevate the camera in the direction of a vertical axis and rotating the camera about the vertical axis along a capturing trajectory around the face of the user, whereby the face of the user may be captured. The elevating in the direction of the vertical axis may be performed along the vertical moving trajectory 120, and the rotating about the vertical axis may be performed along the rotational moving trajectory 130. The 3D face diagnosis apparatus for obtaining 3D image information including face depth information of the front and side views of the face along the moving trajectories is illustrated in FIG. 1. Embodiments are not limited thereto, and there may be various embodiments modified by one of ordinary skill in the art.

The 3D face diagnosis apparatus is described in detail in KR Patent Application No. 10-20170044895 (APPARATUS FOR DIAGNOSING THREE DIMENSIONAL FACE).

Figure 2:
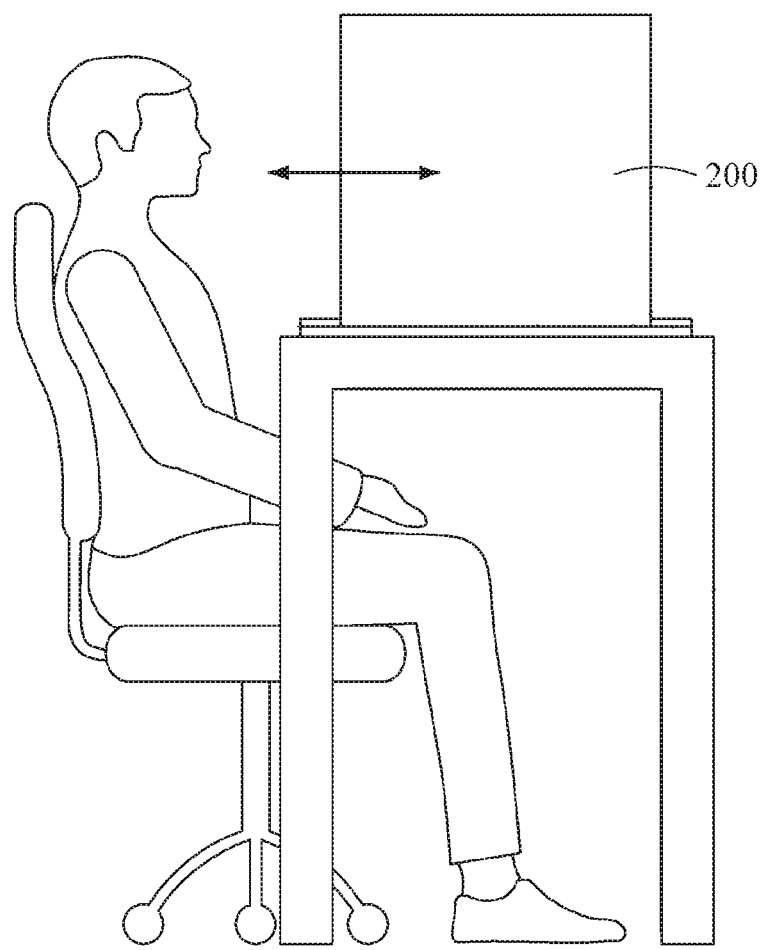
FIG. 2 illustrates an example of operating a 3D face diagnosis apparatus by a user according to an embodiment.

FIG. 2 illustrates an example of operating a 3D face diagnosis apparatus 200 by a user according to an embodiment. FIG. 2 shows an example in which a user measures a face according to an operating method of the 3D face diagnosis apparatus 200, and the 3D face diagnosis apparatus 200 may be moved to a position corresponding to the position of the face of the user.

In detail, the 3D face diagnosis apparatus 200 may move back and forth in the direction viewed by the user. For example, the user may be measured in a sitting position or in a standing position.

Figure 3A:
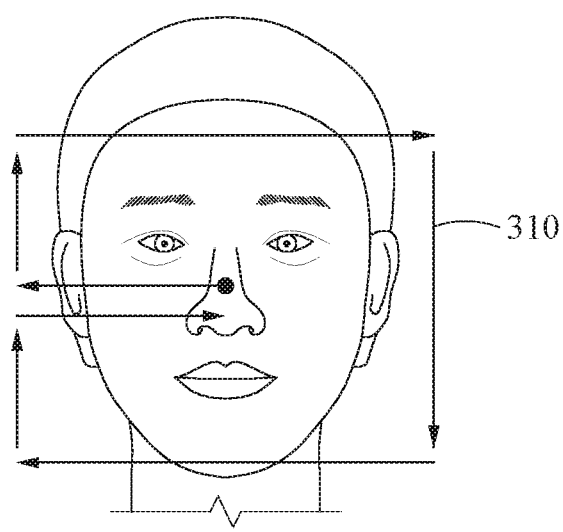
FIG. 3A illustrates a moving path of a camera of a 3D face diagnosis apparatus according to an embodiment.

FIG. 3A illustrates a moving path of a camera of a 3D face diagnosis apparatus according to an embodiment. A 3D face diagnosis apparatus may include a camera, as described with reference to FIG. 1, and the camera may move along a vertical moving trajectory and a rotational moving trajectory. FIG. 3 shows a moving path 310 of the camera.

The moving path starts from center of the face of the user, that is, the nasal bridge, passes through the right ear, and rotates clockwise for capturing. Arrows describe the moving path in detail. The capturing is started first from center of the face indicated as a dot and performed while moving in the direction from center of the face to the right ear, in the direction from the right ear to the right forehead, in the direction from the right forehead to the left forehead, in the direction from the left forehead to the left chin, in the direction from the left chin to the right chin, in the direction from the right chin to the right ear, and finally in the direction from the right ear to center of the face which is the initial start point.

If the capturing is performed along the moving path 310, 3D image information without a blind spot may be acquired. However, a considerable capturing time is needed due to the long moving path of the camera. The movement along the rotational moving trajectory is fixed when the camera is moved along the vertical moving trajectory, and conversely, the movement along the vertical moving trajectory is fixed when the camera is moved along the rotational moving trajectory. Thus, the camera is moved along an individual moving trajectory and requires a long time.

Further, the 3D face diagnosis apparatus moves slower and requires a longer time in an area where the direction is to be changed than in an area for rectilinear movement. Therefore, if the capturing is performed along the moving path 310, it takes a considerable time to acquire the entire 3D face information.

Figure 3B:
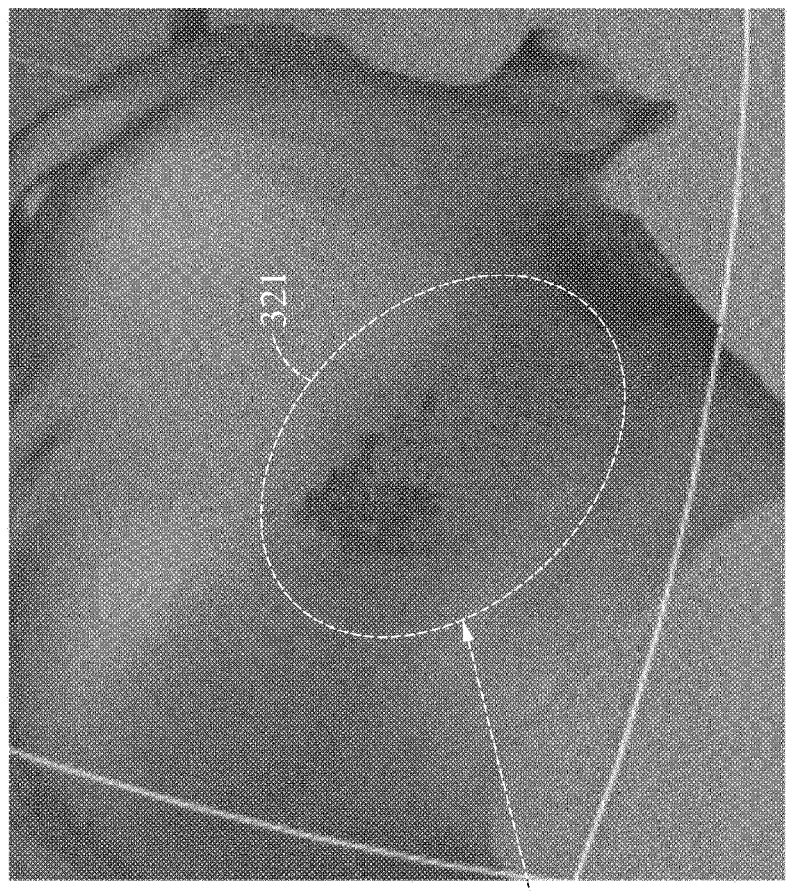
FIG. 3B illustrates another moving path and a blind spot of a camera according to an embodiment.
Figure 3B:
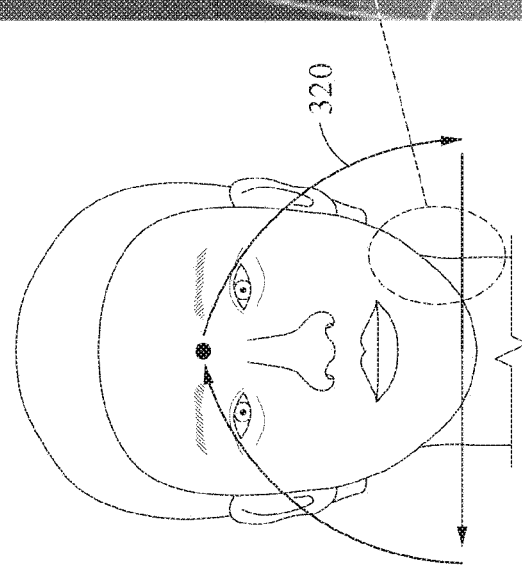

FIG. 3B illustrates another moving path and a blind spot of a camera according to an embodiment. FIG. 3B shows a moving path 320 different from that of FIG. 3A. The moving path 320 starts from center of the face, that is, the midpoint between the eyebrows, and connects in the direction to the left chin, in the direction from the left chin to the right chin, and in the direction from the right chin to the midpoint between the eyebrows again.

If the capturing is performed along the moving path 320, the capturing time is reduced on the path starting from the midpoint between the eyebrows and moving in the direction to the left chin and on the path moving in the direction from the right chin to the midpoint between the eyebrows again. That is because the vertical movement and the rotational movement are performed at the same time during the movements along the two paths. Thus, the capturing time may be reduced when compared to the moving path 310 of FIG. 3A. However, if the capturing is performed along the path, a blind spot occurs in a left chin region 321 of the user due to a discontinuous point on the boundary in the process of continuously matching a 3D model.

Figure 3C:
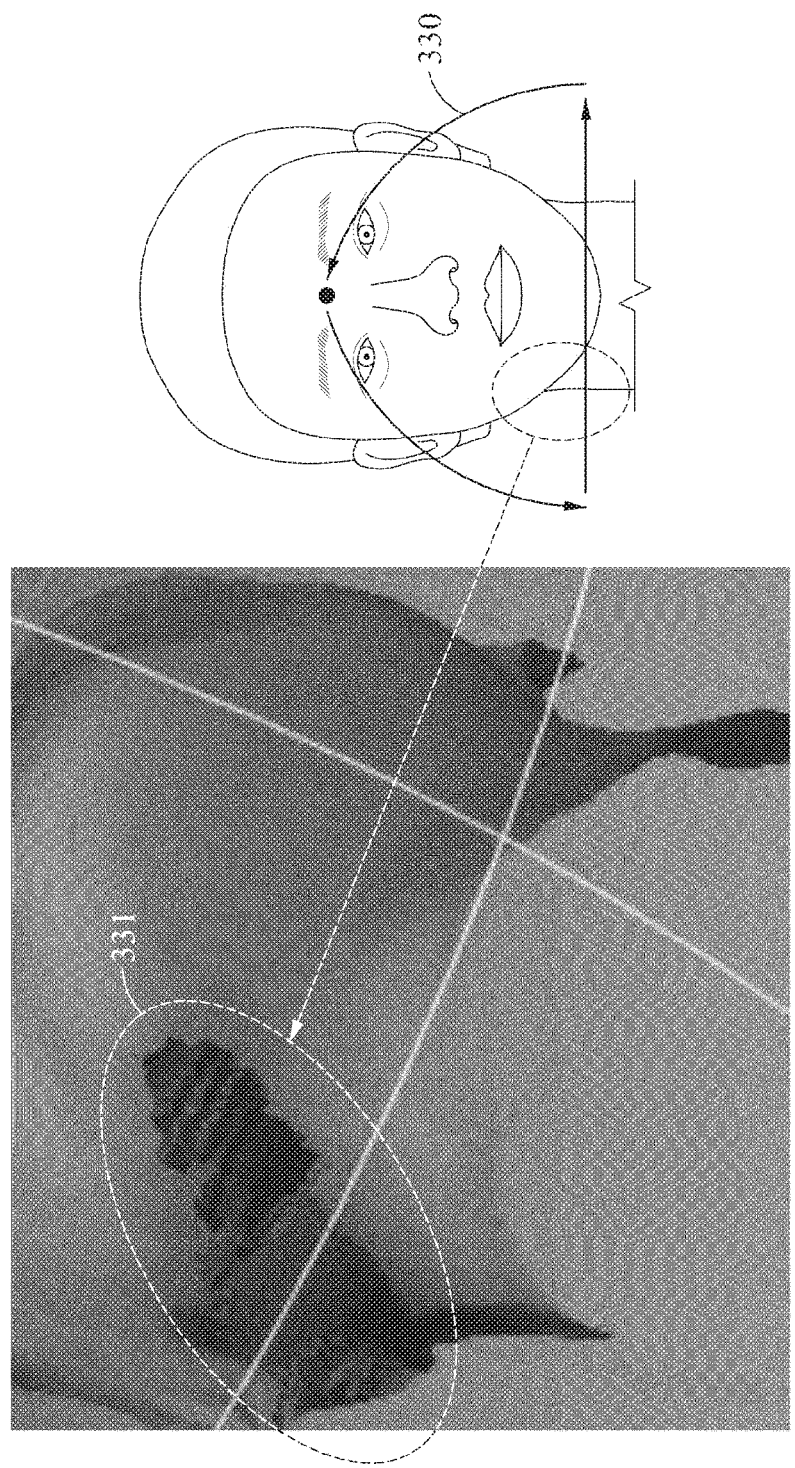
FIG. 3C illustrates another moving path and a blind spot of a camera according to an embodiment.

FIG. 3C illustrates another moving path and a blind spot of a camera according to an embodiment. FIG. 3C shows a moving path 320 different from those of FIGS. 3A and 3B. The moving path 320 starts from center of the face, that is, the midpoint between the eyebrows, and connects in the direction to the right chin, in the direction from the right chin to the left chin, and in the direction from the left chin to the midpoint between the eyebrows again.

If the capturing is performed along the moving path 330, the capturing time is reduced on the path starting from the midpoint between the eyebrows and moving in the direction to the right chin and on the path moving in the direction from the left chin to the midpoint between the eyebrows again, similar to FIG. 3B. Since the vertical movement and the rotational movement are performed at the same time during the movements along the paths, the capturing time may be reduced when compared to the moving path 310 of FIG. 3A. However, a blind spot occurs even if the capturing is performed along the path. In detail, the blind spot occurs in a right chin region 331 of the user due to a discontinuous point on the chin boundary in the process of continuously matching a 3D model.

Figure 4:
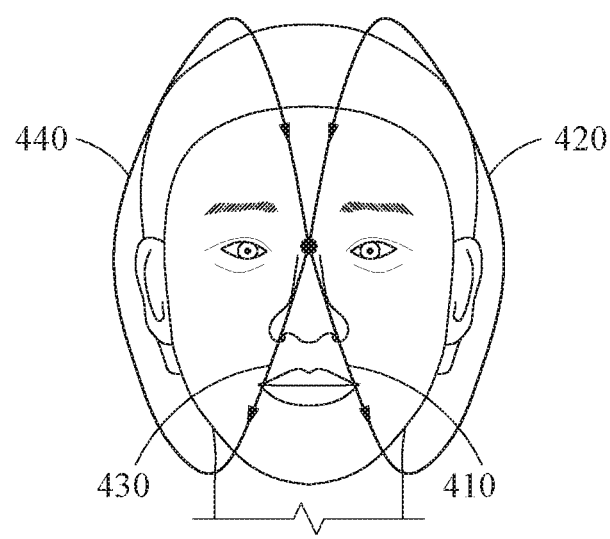
FIG. 4 illustrates an operating method of a 3D face diagnosis apparatus according to an embodiment.

FIG. 4 illustrates an operating method of a 3D face diagnosis apparatus according to an embodiment.

An operating method of a 3D face diagnosis apparatus may start capturing at center of the face. Center of the face may be, for example, the midpoint between the eyebrows, the middle of the forehead, or the nasal bridge, and the height may be changed according to the length of the face of the user. The operating method may include operation 410 of capturing a face region of a user in the direction from center of the face to the left chin, operation 420 of capturing the face region in the direction from the left chin to the left forehead, operation 430 of capturing the face region in the direction from the left forehead to the right chin, operation 440 of capturing the face region in the direction from the right chin to the right forehead, and capturing the face region in the direction from the right forehead to center of the face. The capturing ends at center of the face which is the same as the start point of the capturing.

In general, a human face includes the chin protruding downward. Thus, if the capturing is performed in the manner shown in FIGS. 3B and 3C, blind spots occur. Thus, to prevent blind spots, the left and right chin regions should be captured thoroughly.

The proposed method prevents blind spots in the chin regions by performing operation 410 of capturing the face region of the user in the direction from center of the face to the left chin and operation 430 of capturing the face region in the direction from the left forehead to the right chin. Further, since the capturing is performed in the manner that the path intersects center of the face, the capturing time is reduced. In detail, if the capturing is performed through the operations described above, the moving path of the camera is reduced, the direction changing area is reduced, and thus the time may be reduced.

In addition, the method may also be possible even when capturing the face region in the direction from the left forehead to the right chin is performed earlier than capturing the face region of the user in the direction from the right forehead to the left chin.

Furthermore, operation 420 of capturing the face region in the direction from the left chin to the left forehead and operation 440 of capturing the face region in the direction from the right chin to the right forehead in the method may be performed while convexly moving outward from the face, as shown in FIG. 4. However, embodiments are not limited thereto, and substantially vertical elevation from the chin to the forehead may also be possible.

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An operating method of a three-dimensional (3D) face diagnosis apparatus for obtaining 3D image information including face depth information of the front and side views of a face of a user by capturing the face by elevating a camera in the direction of a vertical axis and rotating the camera about the vertical axis along a capturing trajectory around the face of the user by means of a camera moving instrument, the operating method performed at least temporarily by a computer, the operating method comprising:

capturing a face region of a user in the direction from center of the face to the right chin;
   capturing the face region in the direction from the right chin to the right forehead;
   capturing the face region in the direction from the right forehead to the left chin;
   capturing the face region in the direction from the left chin to the left forehead; and
   capturing the face region in the direction from the left forehead to center of the face.

2. The operating method of claim 1, wherein a moving path in the capturing of the face region in the direction from the right forehead to the left chin passes through center of the face of the user.

3. The operating method of claim 2, wherein a moving path in the capturing of the face region in the direction from the left chin to the left forehead and a moving path in the capturing of the face region in the direction from the right chin to the right forehead convexly move outward from the face of the user.

4. The operating method of claim 3, wherein the capturings of the face region comprise adjusting a moving range based on the size of the face of the user.

5. An operating method of a three-dimensional (3D) face diagnosis apparatus for obtaining 3D image information including face depth information of the front and side views of a face of a user by capturing the face by elevating a camera in the direction of a vertical axis and rotating the camera about the vertical axis along a capturing trajectory around the face of the user by means of a camera moving instrument, the operating method performed at least temporarily by a computer, the operating method comprising:

capturing a face region of a user in the direction from center of the face to the left chin;
   capturing the face region in the direction from the left chin to the left forehead;
   capturing the face region in the direction from the left forehead to the right chin;
   capturing the face region in the direction from the right chin to the right forehead; and
   capturing the face region in the direction from the right forehead to center of the face.

6. The operating method of claim 5, wherein a moving path in the capturing of the face region in the direction from the left forehead to the right chin passes through center of the face of the user.

7. The operating method of claim 6, wherein a moving path in the capturing of the face region in the direction from the left forehead to the left chin and a moving path in the capturing of the face region in the direction from the right forehead to the right chin convexly move outward from the face of the user.

8. The operating method of claim 7, wherein the capturings of the face region comprise adjusting a moving range based on the size of the face of the user.

9. An operating method of a three-dimensional (3D) face diagnosis apparatus for obtaining 3D image information including face depth information of the front and side views of a face of a user by capturing the face by elevating a camera in the direction of a vertical axis and rotating the camera about the vertical axis along a capturing trajectory around the face of the user by means of a camera moving instrument, the operating method performed at least temporarily by a computer, the operating method comprising:

primarily capturing, by a camera part, a face region of a user;
   calculating, by a calculator, the size of a face of the user from the primarily captured image;
   calculating, by the calculator, a moving range of secondary capturing based on the size of the face; and
   capturing, by the camera part, the face region in the direction from center of the face to the right chin, in the direction from the right chin to the right forehead, in the direction from the right forehead to the left chin, in the direction from the left chin to the left forehead, and in the direction from the left forehead to center of the face based on the calculated moving range.

* * * * *